United States Patent
Serafin et al.

(10) Patent No.: US 8,334,840 B2
(45) Date of Patent: Dec. 18, 2012

(54) SYSTEM AND METHOD OF SCREEN MANIPULATION USING HAPTIC ENABLE CONTROLLER

(75) Inventors: Colleen Serafin, Ann Arbor, MI (US); Theodore Charles Wingrove, Canton, MI (US); Anthony Ciatti, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 550 days.

(21) Appl. No.: 12/689,505

(22) Filed: Jan. 19, 2010

(65) Prior Publication Data

US 2011/0175803 A1 Jul. 21, 2011

(51) Int. Cl.
*G09G 5/00* (2006.01)

(52) U.S. Cl. .................................. 345/156; 345/157

(58) Field of Classification Search .................. 345/156, 345/157, 163, 167–169, 173, 684–688
See application file for complete search history.

(56) References Cited

U.S. PATENT DOCUMENTS

| | | | |
|---|---|---|---|
| 5,748,185 A | 5/1998 | Stephan et al. |
| 5,844,392 A | 12/1998 | Peurach et al. |
| 5,986,979 A | 11/1999 | Bickford et al. |
| 6,128,006 A | 10/2000 | Rosenberg et al. |
| 6,185,163 B1 | 2/2001 | Bickford et al. |
| 6,697,043 B1 | 2/2004 | Shahoian |
| 6,707,443 B2 | 3/2004 | Bruneau et al. |
| 6,882,354 B1 | 4/2005 | Nielsen |
| 7,170,491 B2 | 1/2007 | Montalcini |
| 7,312,785 B2 | 12/2007 | Tsuk et al. |
| 7,355,595 B2 | 4/2008 | Bathiche et al. |
| 7,450,110 B2 | 11/2008 | Shahoian et al. |
| 7,463,240 B2 | 12/2008 | Matsumoto et al. |
| 7,535,454 B2 | 5/2009 | Jasso et al. |
| 7,561,141 B2 | 7/2009 | Shahoian et al. |
| 2002/0089545 A1 | 7/2002 | Montalcini |
| 2004/0117084 A1 | 6/2004 | Mercier et al. |
| 2006/0109256 A1 | 5/2006 | Grant et al. |
| 2006/0192771 A1 | 8/2006 | Rosenberg et al. |
| 2007/0236450 A1 | 10/2007 | Colgate et al. |
| 2008/0062145 A1 | 3/2008 | Shahoian et al. |
| 2009/0135164 A1 | 5/2009 | Kyung et al. |
| 2009/0231271 A1 | 9/2009 | Heubel et al. |

FOREIGN PATENT DOCUMENTS

| | | |
|---|---|---|
| DE | 20115882 U1 | 11/2001 |
| DE | 202006020369 U1 | 5/2008 |
| DE | 102007057924 A1 | 12/2008 |
| DE | 112007003600 T5 | 6/2010 |

*Primary Examiner* — Ricardo L Osorio

(74) *Attorney, Agent, or Firm* — Fraser Clemens Martin & Miller LLC; J. Douglas Miller

(57) ABSTRACT

An interface system and a method for manipulating a display are disclosed. The interface system includes a display having a scroll area and a cursor presented thereon, a controller for manipulating a position of the cursor on the display, and a haptic device for generating a plurality of tactile feedbacks to a user through the controller, wherein a movement of the cursor across a peripheral edge of the scroll area of the display results in the haptic device generating a first tactile feedback of the plurality of tactile feedbacks representing a scroll mode, and wherein a movement of the cursor while the cursor is positioned within the scroll area of the display results in the haptic device generating a second tactile feedback of the plurality of tactile feedbacks representing a scroll rate of a visual feedback presented on the display.

20 Claims, 3 Drawing Sheets

SYSTEM AND METHOD OF SCREEN MANIPULATION USING HAPTIC ENABLE CONTROLLER

FIELD OF THE INVENTION

The present invention relates generally to a user interface. More particularly, the invention is directed to an interface system and a method for manipulating a display using a haptic enabled controller.

BACKGROUND OF THE INVENTION

Typically, a user interacts with an interface system via direct manipulation using a touch screen or through indirect manipulation using a control remotely located from a screen. The remote controls often consist of a joystick and buttons to manipulate and select options presented on the screen. Accordingly, when the user is browsing through menus with many entries, a repeated pressing of the button or joystick becomes cumbersome and distracting. In certain systems, a paging function is implemented to quickly navigate through long lists. However, current systems and means for scrolling and paging through a list of visual elements are cumbersome and require a direct visual attention of the user.

It would be desirable to develop an interface system and a method for manipulating a display of the interface system, wherein the interface system includes a haptic enabled controller for providing a tactile feedback to a user during manipulation of the display, thereby minimizing the direct visual attention required to engage the interface system.

SUMMARY OF THE INVENTION

Concordant and consistent with the present invention, an interface system and a method for manipulating a display of the interface system, wherein the interface system includes a haptic enabled controller for providing a tactile feedback to a user during manipulation of the display, thereby minimizing the direct visual attention required to engage the interface system. has surprisingly been discovered.

In one embodiment, an interface system comprises: a display having a scroll area and a cursor presented thereon; a controller for manipulating a position of the cursor on the display, and a haptic device for generating a plurality of tactile feedbacks to a user through the controller, wherein a movement of the cursor across a peripheral edge of the scroll area of the display results in the haptic device generating a first tactile feedback of the plurality of tactile feedbacks representing a scroll mode, and wherein a movement of the cursor while the cursor is positioned within the scroll area of the display results in the haptic device generating a second tactile feedback of the plurality of tactile feedbacks representing a scroll rate of a visual feedback presented on the display.

In another embodiment, an interface system comprises: a display having a scroll area, a cursor, and a user-selectable visual element presented thereon; a controller for manipulating a position of the cursor on the display, and a haptic device for generating a plurality of tactile feedbacks to a user through the controller, wherein a movement of the cursor into the scroll area of the display results in the haptic device generating a first tactile feedback of the plurality of tactile feedbacks representing an entrance into the scroll area, wherein a movement of the cursor while the cursor is positioned within the scroll area of the display results in the haptic device generating a second tactile feedback of the plurality of tactile feedbacks representing a scroll rate of a visual feedback presented on the display, and wherein a movement of the cursor out of the scroll area of the display results in the haptic device generating a third tactile feedback of the plurality of tactile feedbacks representing an exit of the cursor from the scroll area.

The invention also provides methods for manipulating a display.

One method comprises the steps of: presenting a scroll area, a cursor, and a user-selectable element on the display; providing a controller for manipulating a position of the cursor on the display; providing a haptic device for generating a plurality of tactile feedbacks to a user; generating a first tactile feedback of the plurality of tactile feedbacks in response to the cursor moving across a peripheral edge of the scroll area; generating a second tactile feedback of the plurality of tactile feedbacks in response to the cursor moving across the user-selectable element; generating a third tactile feedback of the plurality of tactile feedbacks in response to a selection of the user-selectable element; and generating a fourth tactile feedback of the plurality of tactile feedbacks representing a scroll rate of a visual feedback presented on the display.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
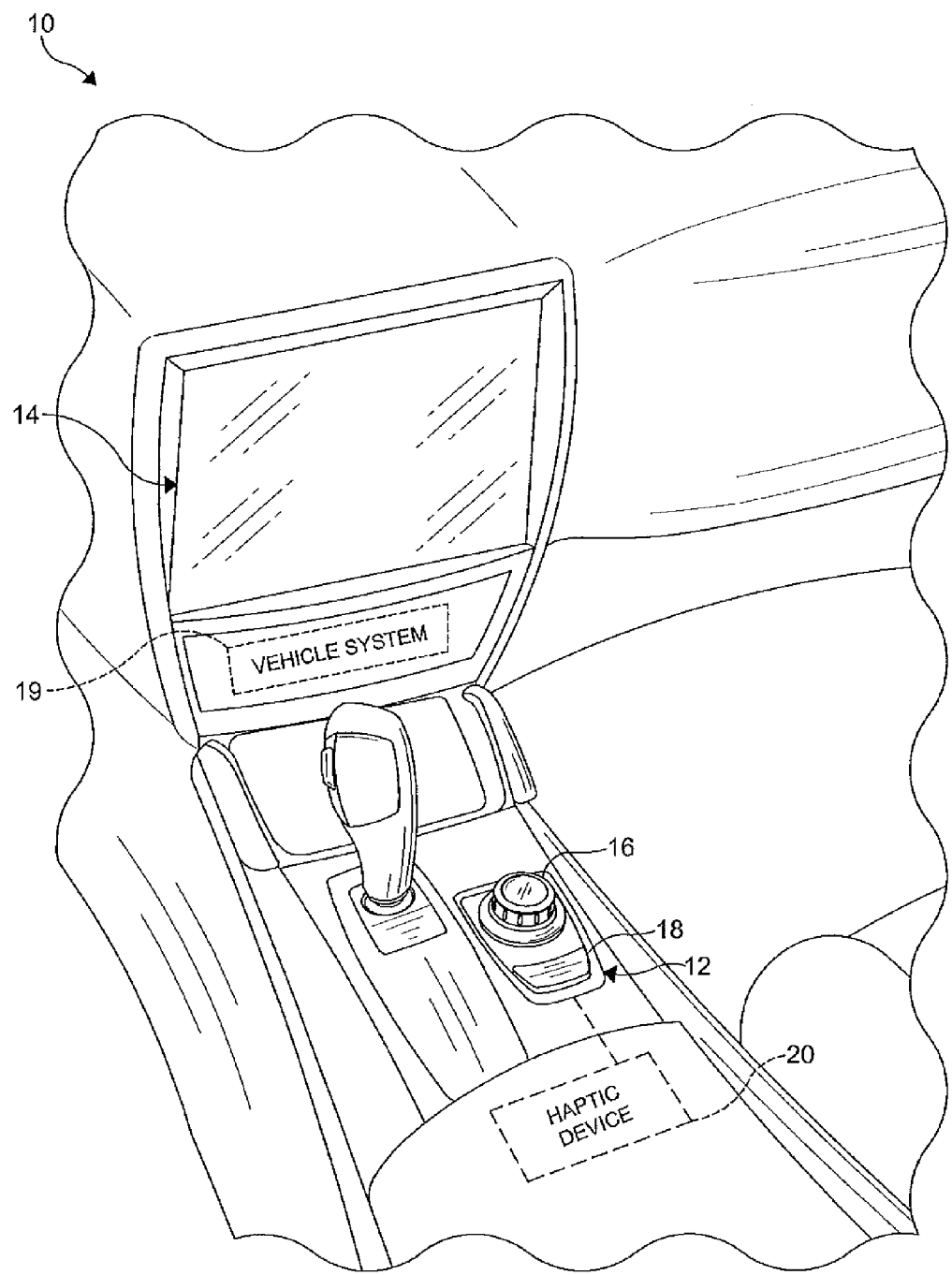
FIG. 1 is a fragmentary perspective view of an interior of a vehicle including an interface system according to an embodiment of the present invention.

FIG. 1 illustrates an interface system 10 integrated into an interior of a vehicle according to an embodiment of the present invention. As shown, the interface system 10 includes a controller 12 and a display 14. It is understood that the interface system 10 may include any number of displays, controllers, and other user interface elements, as desired. It is further understood that the controller 12 and the display 14 can be disposed in any location and position in the vehicle.

In the embodiment shown, the controller 12 is a joy stick disposed in a center stack of the vehicle. As a non-limiting example, the controller 12 includes a user-engageable body 16 having a pre-determined number of degrees of freedom of movement. As a further example, the controller 12 includes a button 18 or interface device for controlling a function of the interface system 10. It is understood that the controller 12 may have any shape and size. It is further understood that the controller 12 may be any device such as a touch sensitive surface, a button, and a knob.

The controller 12 includes a haptic device 20 for generating a tactile feedback therethrough. The haptic device 20 is a variable device for generating a plurality of tactile feedbacks, wherein each of the tactile feedbacks provides a distinct sensation to the user. It is understood that any haptic device or means for generating the tactile feedback may be used. It is further understood that the haptic device 20 may be integrated with the controller or spaced therefrom and adapted to transmit the tactile feedback to a surface of the controller 12.

In the embodiment shown, the display 14 is a graphical user interface disposed in a center stack of the vehicle for viewing by a user (e.g. driver and/or passenger of the vehicle). The display 14 is in data communication with the controller 12 to receive a control signal therefrom for manipulating a visual feedback presented on the display 14.

Figure 2:
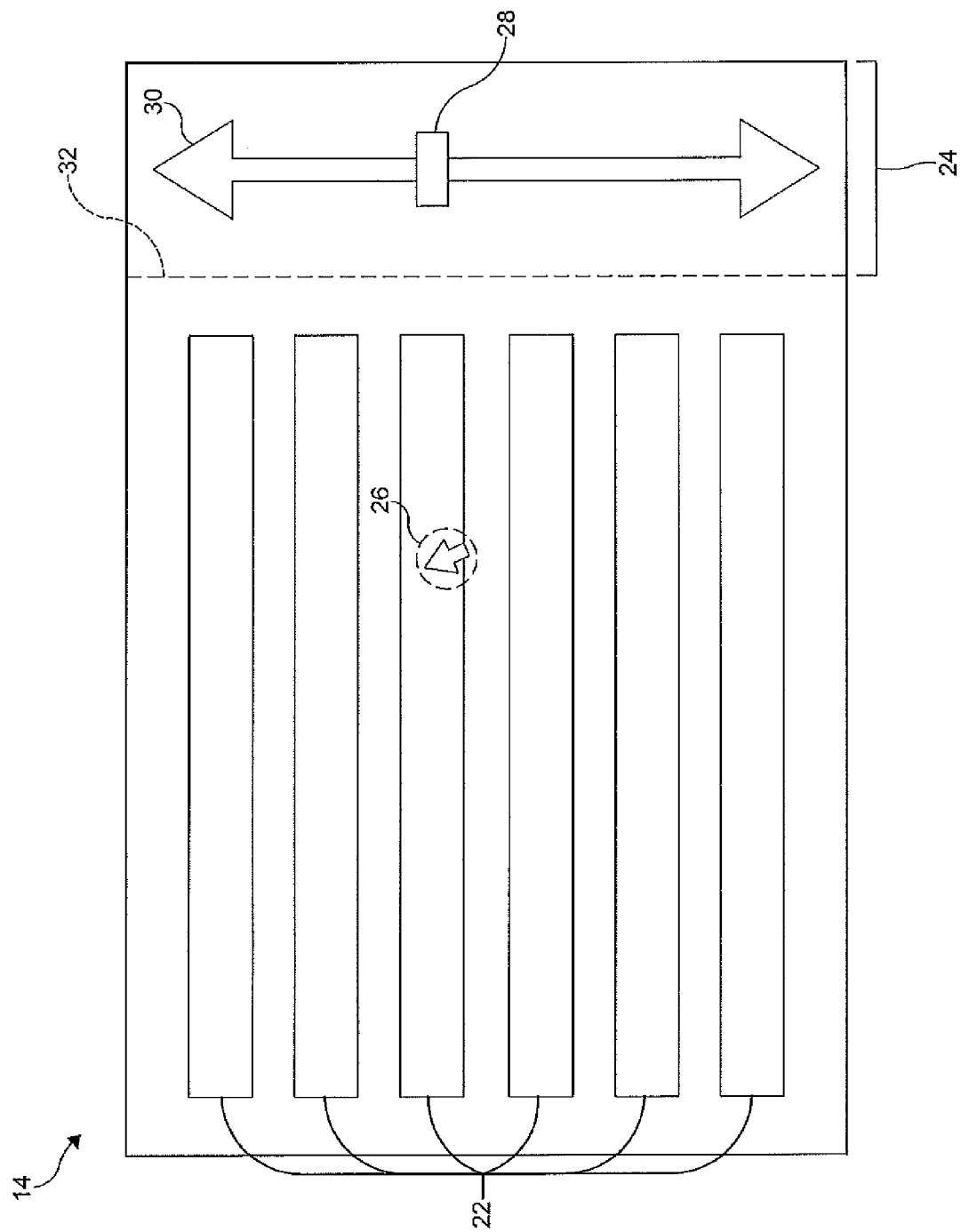
FIG. 2 is front elevational view of a display of the interface system of FIG. 1.

As more clearly shown in FIG. 2, the display 14 presents a plurality of visual elements 22, a scroll area 24, and a cursor 26. The visual elements 22 may be arranged in a list form and may include graphical and/or textual representations. As a non-limiting example, the visual elements 22 are a textual list of media files that can be selective engaged to generate a media output such as a video or audio output. As a further example, the visual elements 22 include an arrangement of graphical icons that can be selectively engaged to control an executable function of a particular vehicle system 19 such as an audio system, a video system, a global positioning system, a navigation system, and any other user controlled system of the vehicle, for example. It is understood that the visual elements 22 can be any user-selectable element and does not need to have a visual icon associated therewith. For example, an audio cue can be used to distinguish one user-selectable element from another.

The scroll area 24 is shown disposed adjacent a periphery of the display 14. It is understood that the scroll area 24 may be disposed in any position and orientation on the display 14. The scroll area 24 provides a selective control of the visual feedback presented on the display 14. The scroll area 24 includes a position indicator 28 disposed on a scroll bar 30, wherein the position indicator 28 represents a viewable portion of the visual elements 22 presented on the display 14.

The cursor 26 is an icon presented on the display 14 to provide selective engagement of the visual feedback presented thereon. Specifically, a motion and a position of the cursor 26 are responsive to a manipulation of the controller 12. As shown, the cursor 26 is a selection arrow to provide a user with an interactive experience with the visual elements 22 on the display 14. It is understood that the cursor 26 can take any form and have any shape and size, as desired.

Figure 3:
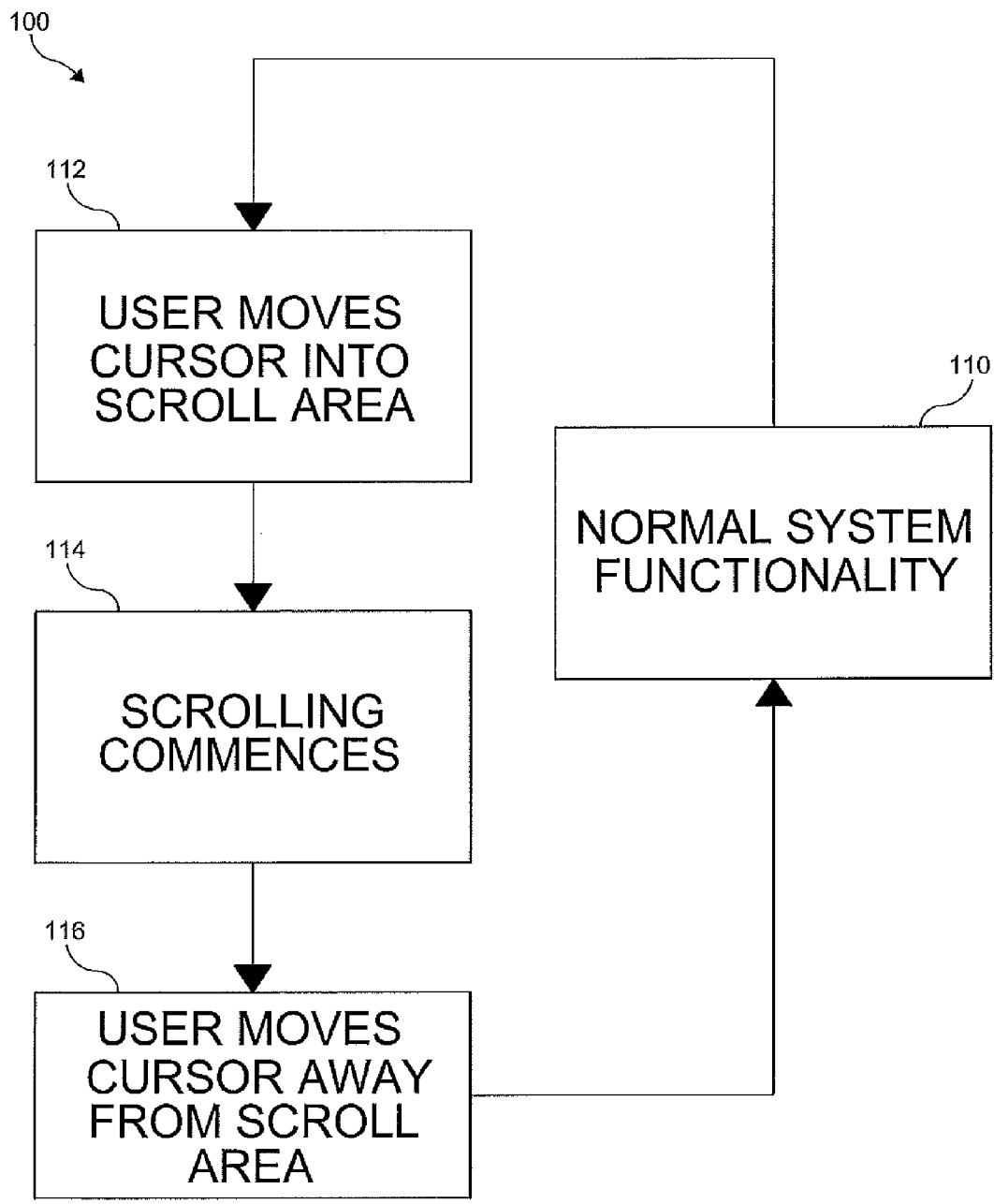
FIG. 3 is a schematic block flow diagram of a method for manipulating a display according to an embodiment of the present invention.

FIG. 3 illustrates a method 100 of manipulating the display 14 of the interface system 10. In step 110, the interface system 10 functions in a normal or default mode. As a non-limiting example, in a normal mode, the controller 12 is manipulated by a user to navigate through a visible portion of the visual elements 22 (e.g. a typical list currently presented on the display 14). As the user navigates across the visual elements 22, the haptic device 20 generates a tactile feedback representing a selection state of the cursor 26. For example, the tactile feedback representing the selection state of the cursor 26 generates a sensation of a hard pulse or detent through the controller 12 as the cursor 26 is navigated from one of the visual elements 22 to another. As a further example, the user manipulates the controller 12 to select or "highlight" a desired one of the visual elements 22.

In certain embodiments, the haptic device 20 generates a tactile feedback representing the selection of one of the visual elements 22. The selection of a particular one of the visual elements 22 initiates an associated executable function of the vehicle system 19. As a non-limiting example, the user can select a song from a playlist to begin an audio playback. As a further example, the user can select an icon to modify settings of the vehicle system 19.

To navigate to a non-visible portion of the visual elements 22 that may be a few pages away from a currently highlighted one of the visual elements 22, the user manipulates the controller 12 to move the cursor 26 into the scroll area 24, as shown in step 112. As the user navigates the cursor across a peripheral edge 32 of the scroll area 24, the haptic device 20 generates a tactile feedback representing an entering into or an exiting from the scroll area 24 (i.e. a scroll mode). As a non-limiting example, the tactile sensation representing the scroll mode generates a sensation that resists a manipulation of the controller 12. Accordingly, the user must overcome the resistive tactile sensation representing the scroll mode in order to move the cursor 26 into or out of the scroll area 24. In other words, the tactile sensation representing the scroll mode is generated through the controller 12 when the cursor 26 is moving across the peripheral edge 32 of the scroll area 24 to create a virtual wall to communicate to the user that the cursor 26 has reached the peripheral edge 32 of the scroll area 24. Once the user overcomes the resistive sensation of the tactile feedback representing the scroll mode and the cursor 26 is moved into the scroll area 24, the interface system 10 enters an active scrolling mode and allows for scrolling of the visual elements 22, as shown in step 114. While the cursor 26 is within the scroll area 24, the resistive tactile feedback representing a scroll mode provides a "lock in" effect to allow the user to easily remain in the scroll area 24 without actually looking at the display 14. In certain embodiments, the manipulation of the position of the cursor 26 in a scrolling direction requires less force on the controller 12 than a manipulation of the position of the cursor 26 in a direction perpendicular to the scrolling direction.

To navigate to one of the visual elements 22 that may be hundreds of elements or pages away from the currently highlighted one of the visual elements 22, the user manipulates the controller 12 (e.g. a pull back or a push forward motion) to scroll through the list of the visual elements 22. In certain embodiments, a greater pressure exerted on the controller 12 results in a greater scroll rate through the visual elements 22. As the position indicator 28 on the scroll bar 30 moves and the display 14 is scrolling through the visual elements 22, the haptic device 20 generates a tactile feedback representing a scroll rate. As a non-limiting example, the tactile feedback representing a scroll rate creates a variable sensation that resists a manipulation of the controller 12. As the user applies more pressure to the controller 12 to scroll at a faster rate, the tactile feedback representing the scroll rate increases in intensity (e.g. amplitude and/or frequency). Accordingly, as the scroll rate increases, the requisite force required to manipulate the controller 12 increases. It is understood that another tactile feedback may be generated when the position indicator 28 reaches an end of the scroll bar 30.

Once the user scrolls to a desired position along the scroll bar 30, the user must exit the active scrolling mode to select one of the visual elements 22 visible on the display 14. Specifically, the user manipulates the controller 12 to move the cursor 26 out of the scroll area 24, as shown in step 116. As the user navigates the cursor 26 across the peripheral edge 32 of the scroll area 24, the haptic device 20 generates the tactile feedback representing the scroll mode. As a non-limiting example, the tactile feedback representing the scroll mode generates a sensation that resists a manipulation of the controller 12. Accordingly, the user must overcome the sensation generated by the tactile feedback representing the scroll mode in order to move the cursor 26 out of the scroll area 24. Once the user overcomes the resistive sensation of the tactile feedback representing the scroll mode, the cursor 26 is moved out of the scroll area 24 and the interface system 10 enters the normal mode that allows for selection of the visual elements 22, as shown in step 110.

The interface system 10 provides the haptic enabled controller 12 manipulating the display 14, thereby minimizing the direct visual attention required to engage and scroll through the visual elements 22 presented on the display 14. The tactile feedbacks generated through the controller 12 provide a sensory communication to the user of the position of the cursor 26 on the display 14. Each of the tactile feedbacks can be generated in a distinct manner to create a unique sensation for identifying a position of the cursor 26 or a functionality associated with the interface system 10, thereby minimizing a required visual contact between the user and the display 14.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An interface system comprising:
   a display having a scroll area and a cursor presented thereon;
   a controller for manipulating a position of the cursor on the display, and
   a haptic device for generating a plurality of tactile feedbacks to a user through the controller, wherein a movement of the cursor across a peripheral edge of the scroll area of the display results in the haptic device generating a first tactile feedback of the plurality of tactile feedbacks representing a scroll mode, and wherein a movement of the cursor while the cursor is positioned within the scroll area of the display results in the haptic device generating a second tactile feedback of the plurality of tactile feedbacks representing a scroll rate of a visual feedback presented on the display.

2. The interface system according to claim 1, wherein the display presents a user-selectable element thereon.

3. The interface system according to claim 2, wherein the user-selectable element represents an executable function of a vehicle system.

4. The interface system according to claim 2, wherein the haptic device generates a tactile feedback through the controller as the cursor is navigated across the user-selectable element.

5. The interface system according to claim 2, wherein the haptic device generates a tactile feedback through the controller in response to a selection of the user-selectable element presented on the display.

6. The interface system according to claim 1, wherein the haptic device is integrated with the controller.

7. The interface system according to claim 1, wherein the first tactile feedback resists a manipulation of the controller.

8. The interface system according to claim 1, wherein an amount of force exerted in the controller determines the scroll rate.

9. The interface system according to claim 1, wherein an intensity of the second tactile feedback increases as the scroll rate increases.

10. An interface system comprising:
    a display having a scroll area, a cursor, and a user-selectable visual element presented thereon;
    a controller for manipulating a position of the cursor on the display, and
    a haptic device for generating a plurality of tactile feedbacks to a user through the controller, wherein a movement of the cursor into the scroll area of the display results in the haptic device generating a first tactile feedback of the plurality of tactile feedbacks representing an entrance into the scroll area, wherein a movement of the cursor while the cursor is positioned within the scroll area of the display results in the haptic device generating a second tactile feedback of the plurality of tactile feedbacks representing a scroll rate of a visual feedback presented on the display, and wherein a movement of the cursor out of the scroll area of the display results in the haptic device generating a third tactile feedback of the plurality of tactile feedbacks representing an exit of the cursor from the scroll area.

11. The interface system according to claim 10, wherein the user-selectable visual element represents an executable function of a vehicle system.

12. The interface system according to claim 10, wherein the haptic device generates a tactile feedback through the controller as the cursor is navigated across the visual element.

13. The interface system according to claim 10, wherein the haptic device generates a tactile feedback through the controller in response to a selection of the visual element presented on the display.

14. The interface system according to claim 10, wherein the haptic device is integrated with the controller.

15. The interface system according to claim 10, wherein at least one of the first tactile feedback and the third tactile feedback resists a manipulation of the controller.

16. The interface system according to claim 10, wherein an amount of force exerted in the controller determines the scroll rate.

17. The interface system according to claim 10, wherein an intensity of the second tactile feedback increases as the scroll rate increases.

18. A method for manipulating a display, the method comprising the steps of:
    presenting a scroll area, a cursor, and a user-selectable element on the display;
    providing a controller for manipulating a position of the cursor on the display;
    providing a haptic device for generating a plurality of tactile feedbacks to a user;
    generating a first tactile feedback of the plurality of tactile feedbacks in response to the cursor moving across a peripheral edge of the scroll area;
    generating a second tactile feedback of the plurality of tactile feedbacks in response to the cursor moving across the user-selectable element;
    generating a third tactile feedback of the plurality of tactile feedbacks in response to a selection of the user-selectable element; and
    generating a fourth tactile feedback of the plurality of tactile feedbacks representing a scroll rate of a visual feedback presented on the display.

19. The method according claim 18, wherein at least one of the first tactile feedback and the fourth tactile feedback resists a manipulation of the controller.

20. The method according to claim 18, wherein an intensity of the fourth tactile feedback increases as the scroll rate increases.

* * * * *